(12) United States Patent
Kobayashi

(10) Patent No.: US 8,432,559 B2
(45) Date of Patent: Apr. 30, 2013

(54) IMAGE PROCESSING APPARATUS, IMAGE PROCESSING METHOD, PROGRAM AND STORAGE MEDIUM

(75) Inventor: Noriyuki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 732 days.

(21) Appl. No.: 12/054,295

(22) Filed: Mar. 24, 2008

(65) Prior Publication Data

US 2008/0309970 A1    Dec. 18, 2008

(30) Foreign Application Priority Data

Apr. 3, 2007  (JP) ................. 2007-097487

(51) Int. Cl.
*G06K 15/00*    (2006.01)
(52) U.S. Cl.
USPC ........... 358/1.14; 358/1.9; 358/2.1; 358/1.13; 358/1.15; 358/1.18; 382/181; 382/190; 399/79; 399/80; 399/81; 399/82
(58) Field of Classification Search ............... 358/1.14, 358/1.15, 1.9, 2.1, 1.13, 1.18; 382/181, 190; 399/79, 80, 81, 82
See application file for complete search history.

(56) References Cited

U.S. PATENT DOCUMENTS

| | | | |
|---|---|---|---|
| 2004/0184065 A1* | 9/2004 | Guan et al. | 358/1.14 |
| 2005/0213137 A1* | 9/2005 | Kawano et al. | 358/1.14 |
| 2005/0286090 A1* | 12/2005 | Ahne et al. | 358/452 |
| 2006/0126095 A1* | 6/2006 | Tamura et al. | 358/1.14 |
| 2006/0197972 A1* | 9/2006 | Hayashi | 358/1.14 |
| 2007/0041031 A1* | 2/2007 | Kaneko | 358/1.14 |

FOREIGN PATENT DOCUMENTS

JP    2002-298122 A    10/2002

* cited by examiner

*Primary Examiner* — Vu B Hang
(74) *Attorney, Agent, or Firm* — Canon USA, Inc., IP Division

(57) ABSTRACT

An image processing apparatus capable of outputting image data by a plurality of output methods includes storing image data, managing output restriction information corresponding to a predetermined region of the stored image data, executing output restriction processing of the image data corresponding to the predetermined region based on the output restriction information of one of the plurality of output methods, selecting one of the plurality of output methods when the image data is output, and outputting the image data on which the output restriction processing is executed by the selected output method.

11 Claims, 14 Drawing Sheets

IMAGE PROCESSING APPARATUS, IMAGE PROCESSING METHOD, PROGRAM AND STORAGE MEDIUM

BACKGROUND OF THE INVENTION

1. Field of the Invention

The present invention relates to an image processing apparatus which restricts an output of an image contained in a predetermined region of image data in response to an output method of the image data and an image processing method, a program, and a storage medium therefor.

2. Description of the Related Art

In recent years, image data containing various contents can easily be handled. In various scenes, image data is output and used. For example, image data (containing text data and image data) prepared beforehand as documents of a meeting can be stored in a storage medium, output to a large display apparatus, and projected onto a screen using a projector.

Further, in order to distribute stored image data to participants as documents of a meeting, the image data can be printed using a printer or can be transmitted to terminals of respective participants as a file attached to an electronic mail.

Recently, there has been an increasing necessity to ensure sufficient security of highly confidential information. For example, when highly confidential information is contained in image data, which is displayed and used as a presentation material for a meeting, if the image data is printed and transmitted as is, the highly confidential information may be disclosed. For example, if image data is printed at the meeting and distributed to the meeting attendees, the attendees could accidentally walk off with the image data containing the highly confidential information. If the image data is transmitted via electronic mail, an unintended recipient of the electronic mail may obtain a copy of the image data, and thus access the highly confidential information.

Thus, as a method for ensuring a security of a region containing highly confidential information in image data, the following method is discussed. That is, Japanese Patent Application Laid-Open No. 2002-298122 discusses an information disclosure system that sets a disclosure level for each region in image data. Then, when a user requests to read the image data, the image data is revised (for example, region where disclosure is restricted is masked) corresponding to a level of a reading right of the user and disclosed.

However, according to a method described in Japanese Patent Application Laid-Open No. 2002-298122, an output of an image in a predetermined region can be restricted as to each user who reads image data but cannot be restricted in response to an output method.

For example, the method cannot handle a case where display of an image contained in a region where image data used as documents of a meeting exists is permitted but printing is prohibited. In such a case, a user must prepare each image data for display and printing respectively beforehand. This causes a troublesome operation. Similarly, if printing is permitted and transmission is prohibited, each image data for printing and transmission must be prepared in advance respectively.

SUMMARY OF THE INVENTION

The present invention is directed to an image processing apparatus which restricts an output of an image contained in a predetermined region of image data in response to an output method of the image data and an image processing method, a program, and a storage medium therefor.

According to an aspect of the present invention, an image processing apparatus configured to output image data by a plurality of output methods includes a storage unit configured to store the image data, a management unit configured to manage output restriction information corresponding to a predetermined region of the image data, a processing unit configured to execute output restriction processing of the image data corresponding to the predetermined region based on the output restriction information of one of the plurality of output methods, a selection unit configured to select one of the plurality of output methods when the image data is output, and a control unit configured to output the image data, on which the processing unit executes the output restriction processing, by the output method selected in the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
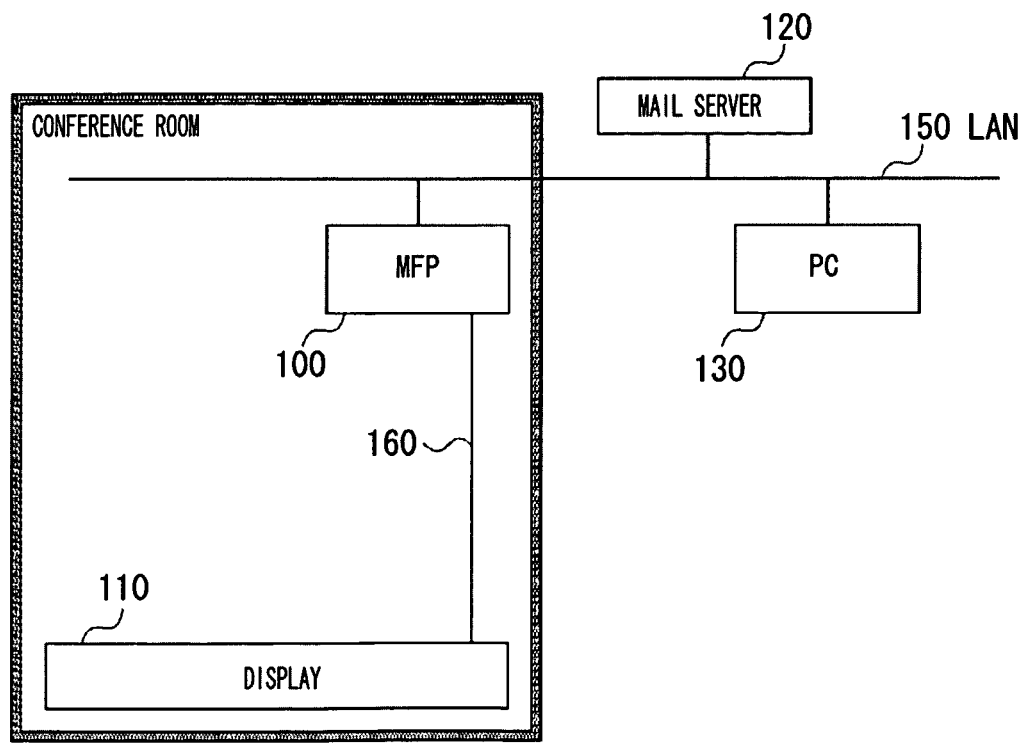
FIG. 1 is a general view of a system illustrating an image data output system according to an exemplary embodiment of the present invention.

FIG. 1 is a general view of an image data output system according to a first exemplary embodiment of the present invention. A conference room includes a multifunction peripheral (MFP) 100 connected to a local area network (LAN) 150 and a display apparatus 110 locally connected to the MFP 100 via a cable 160. The display apparatus 110 displays image data, such as a presentation material for a meeting, based on a display signal which is output from the MFP 100.

A mail server 120 and a personal computer (PC) 130 are also connected to the LAN 150. The MFP 100 can attach image data stored in the MFP 100 itself using a method described below to an electronic mail and transmit the electronic mail to the PC 130 via the mail server 120.

Figure 2:
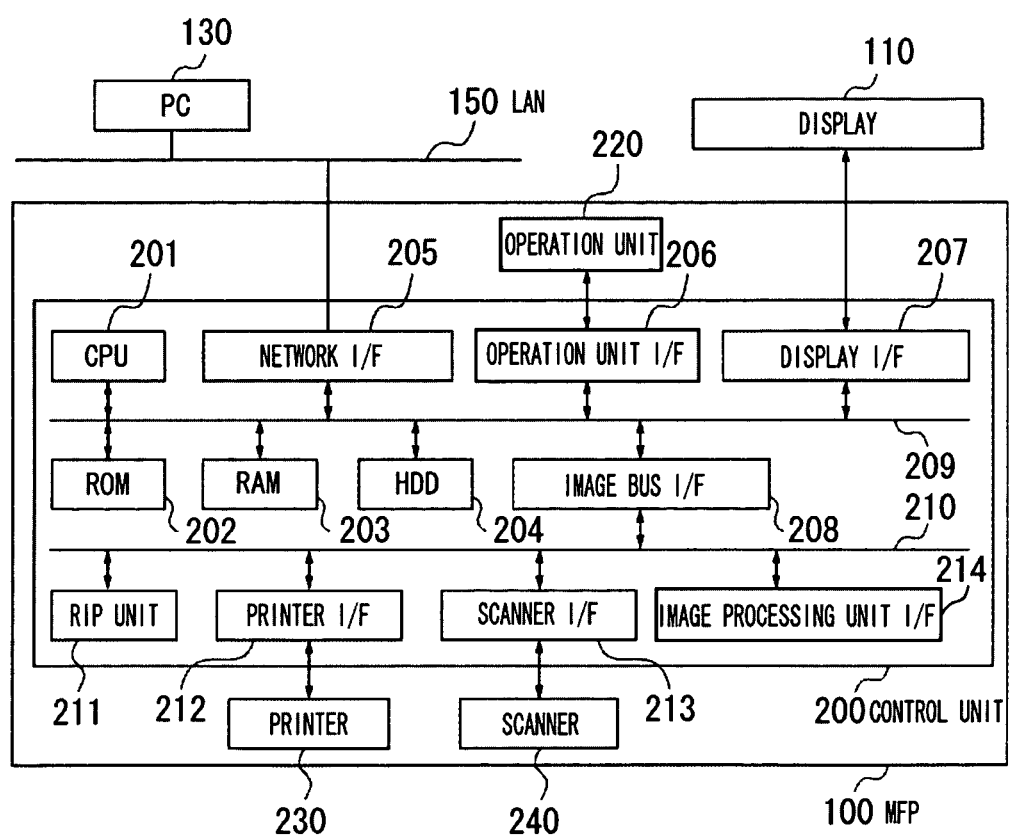
FIG. 2 is a system block diagram illustrating a multifunction peripheral (MFP) system according to an exemplary embodiment of the present invention.

FIG. 2 is a system block diagram of the MFP 100. A control unit 200 is connected to a scanner 240 which serves as an image input device and a printer 230 which serves as an image output device. The control unit 200 is also connected to the LAN 150 and the display apparatus 110, and controls input and output of image data, device information, etc.

A central processing unit (CPU) 201 controls an operation of the MFP 100. The CPU 201 operates based on a program stored in a random access memory (RAM) 203. The RAM 203 is an image memory to temporarily store image data. A read only memory (ROM) 202 is a boot ROM and stores a boot program of a system.

A hard disk drive (HDD) 204 stores system software, image data, and a program to control an operation of the MFP 100. The program stored in the HDD 204 is loaded into the RAM 203. The CPU 201 controls the operation of the MFP 100 based on the loaded program.

A network interface (I/F) 205 is connected to the LAN 150 and controls input and output of various kinds of information. An operation unit I/F 206 is an interface to connect an operation unit 220 and the control unit 200. The operation unit I/F 206 outputs image data to display the data on the operation unit 220 and transmits information input by a user from the operation unit 220 to the CPU 201.

A display I/F 207 is an interface to connect the display apparatus 110 and the control unit 200 and outputs a display signal to display on the display apparatus 110.

An image bus I/F 208 is an interface to connect a system bus 209 and an image bus 210 and controls high-speed input and output of image data. A raster image processor (RIP) unit 211 rasterizes a page description language (PDL) cord received from the PC 130, etc., via the LAN 150 and the network I/F 205 into a bit map image.

A printer I/F 212 is an interface to connect the printer 230 and the control unit 200 and outputs image data to the printer 230 to be output from the printer 230. A scanner I/F 213 is an interface to connect the scanner 240 and the control unit 200 and transfers image data input from the scanner 240.

An image processing unit I/F 214 executes various kinds of processing such as correction and resolution conversion for image data output from the printer 230. Further, the image processing unit I/F 214 executes various kinds of processing such as correction, processing, and editing for image data input from the scanner 240.

Figure 3:
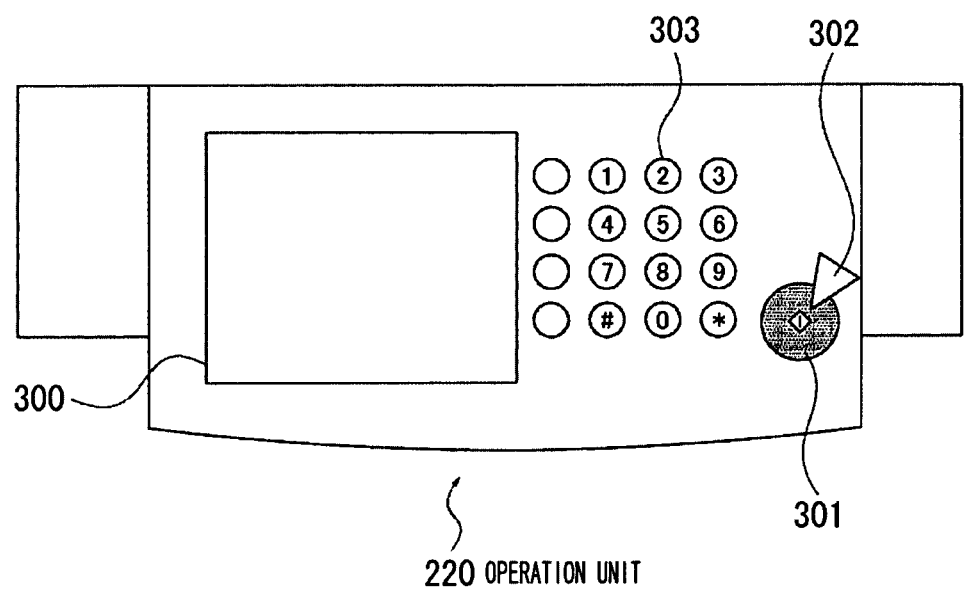
FIG. 3 is an external view of an operation unit according to an exemplary embodiment of the present invention.

FIG. 3 is an external view of the operation unit 220 of the MFP 100. A liquid crystal panel unit 300 is a liquid crystal display apparatus including a touch panel sheet and can display an operation screen to execute various settings and input setting information.

The liquid crystal panel unit 300 can also display a preview of image data stored in the HDD 204. When a user inputs instructions using a touch panel, the liquid crystal panel unit 300 detects position information on a location touched by the user and transmits corresponding instruction contents to the CPU 201 via the operation unit I/F 206.

A start key 301 is a hard key to instruct a start of a reading operation by the scanner 240 and a printing operation by the printer 230. Green and red light emitting diodes (LED) are incorporated into the start key 301. If the operation is ready to start, the green LED is turned on. If the operation is not ready to start, for example due to an error, etc., the red LED is turned on. A stop key 302 is a hard key to instruct termination of an operation.

Hard keys 303 include ten-keys to input numerical values such as the number of copies, a log-in key through which a user inputs user identification data (ID) and a password to log in, and a user mode key to switch to a user mode to execute various settings of the apparatus.

Figure 4:
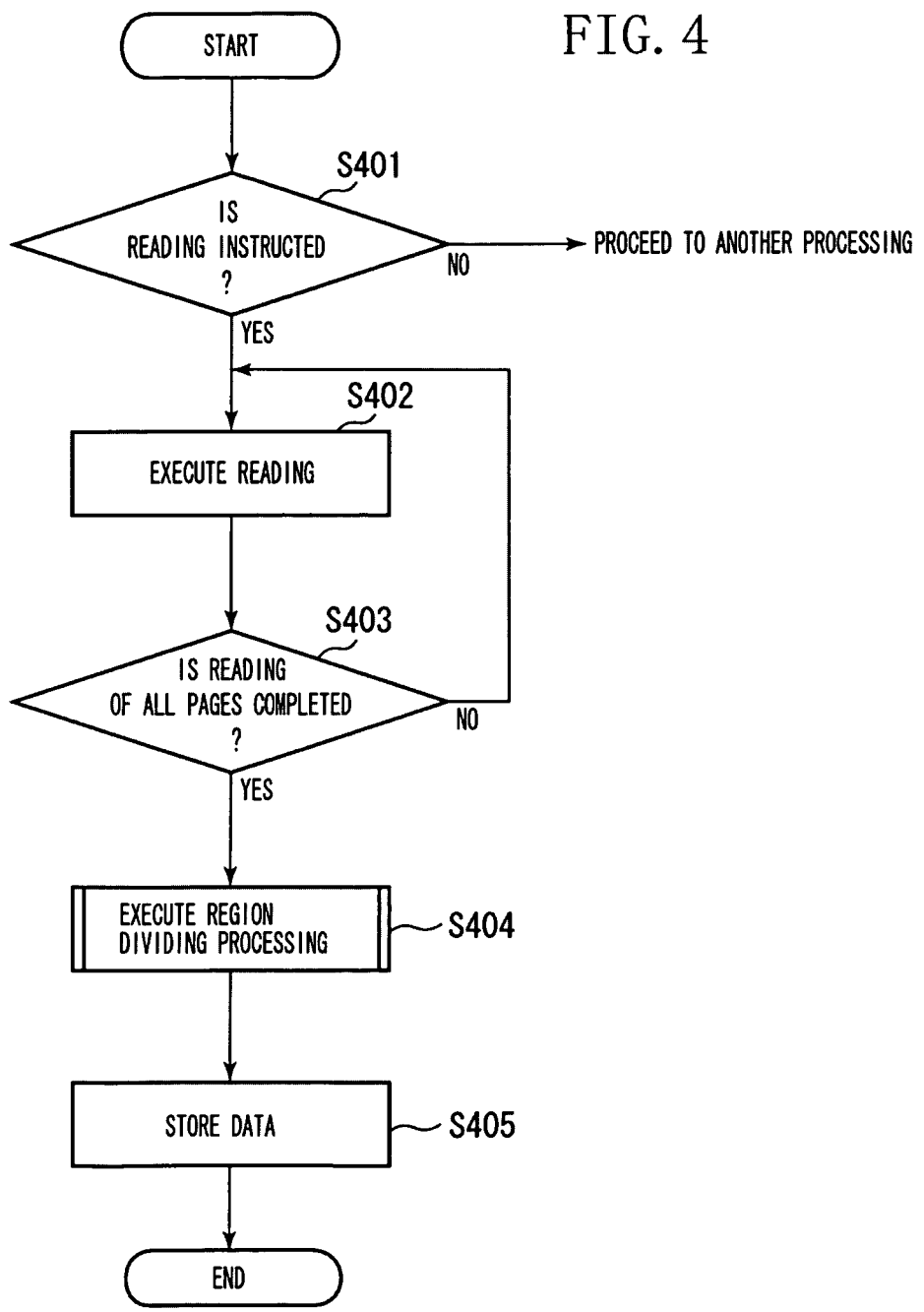
FIG. 4 is a flowchart illustrating an operation of reading an image on a document and inputting image data according to an exemplary embodiment of the present invention.

Next, a series of operations of reading an image on a document using the scanner 240, inputting image data, and storing the image data in the HDD 204 will be described with reference to a flowchart shown in FIG. 4. The CPU 201 of the control unit 200 executes control of the series of operations in the flowchart shown in FIG. 4 based on a program stored in the HDD 204.

First, in step S401, the CPU 201 determines whether execution of a reading operation has been instructed (via the operation unit 220). If the CPU 201 determines that an instruction has been issued (YES in step S401), the processing proceeds to step S402. If no instruction was issued (NO in step S401), the CPU 201 executes another processing.

In step S402, the CPU 201 causes the scanner 240 to read an image on a document and inputs image data. Then, in step S403, the CPU 201 determines whether reading of all pages is completed. If unprocessed pages remain (NO in step S403), the processing returns to step S402 to continue the processing. If the CPU 201 determines that reading of all pages has been completed (YES in step S403), the processing proceeds to step S404, where the CPU 201 executes region division processing of input image data.

In the first exemplary embodiment, the CPU 201 automatically executes the region division processing for image data input by the scanner 240. The region division processing is to divide image data into a plurality of regions for each classification, such as a text region and an image region, by analyzing the contents of image data, and to divide the text region into a plurality of regions corresponding to a layout of documents in the image data.

Further, for an algorithm used in the region division processing executed in step S404, any of known techniques described in, for example, Japanese Patent Application Laid-Open No. 08-030788 may be employed.

In step S405, the CPU 201 stores input image data in the HDD 204 together with information that indicates each region obtained by the region division processing in step S404. While the present example illustrates automatic execution of region division processing for input image data from the scanner 240, other methods may be employed. That is, the region division processing may be executed not only for all input image data, but also for image data selected by a user at any time.

Next, with respect to each of a plurality of regions obtained by region division processing, an operation of setting output restriction information to execute output restriction in response to an output method will be described. In the present embodiment, an attribute whether to prohibit an output in response to a plurality of output methods, such as display, printing, and transmission, can be set to the region divided by the region division processing.

For example, some materials used in presentation of a meeting may include highly confidential contents for which it is OK to display for explanation, but should not be publicly distributed. In such a case, setting an attribute to prohibit printing and transmission beforehand to a highly confidential region can prevent dissemination of the highly confidential information.

Figure 5:
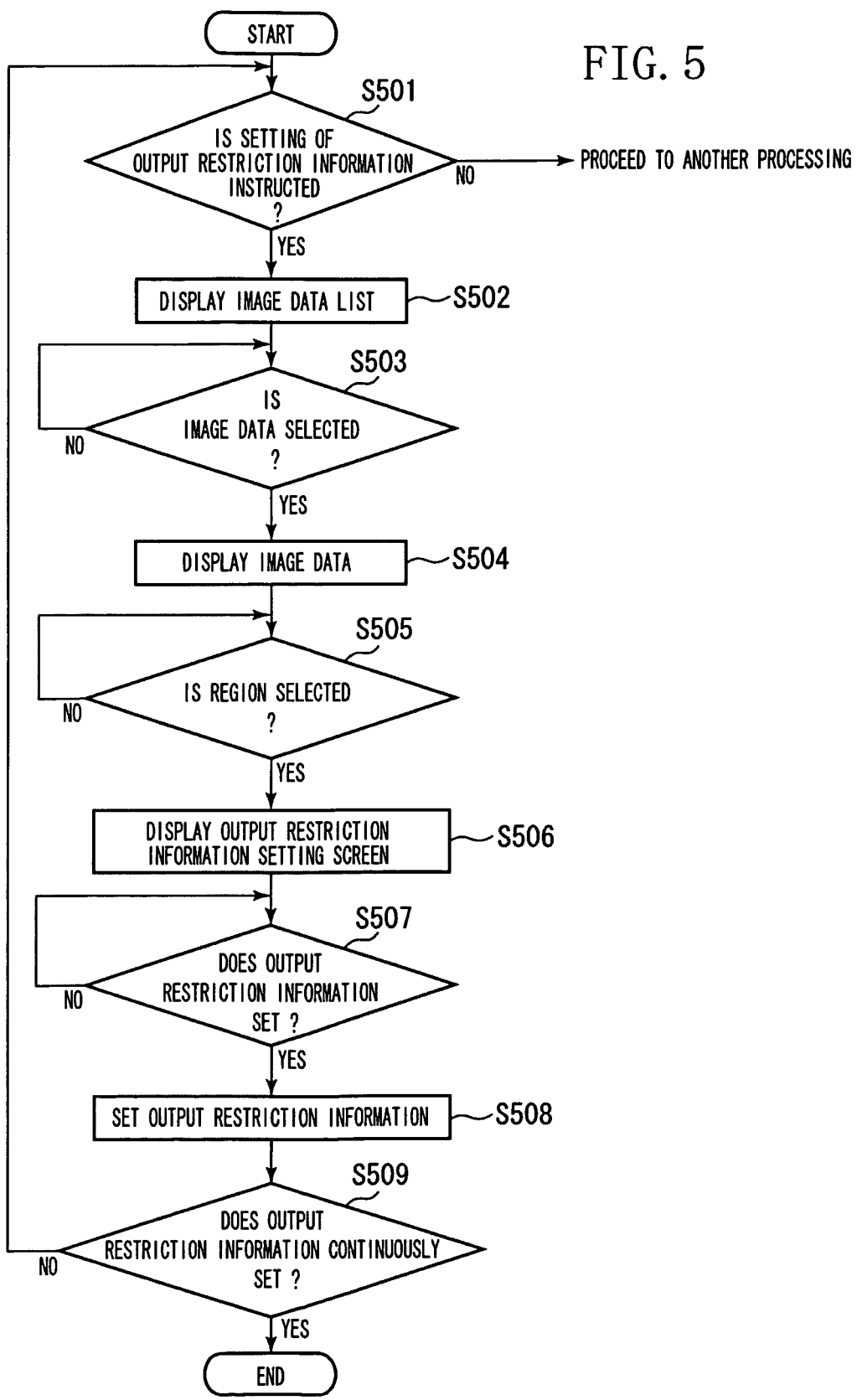
FIG. 5 is a flowchart illustrating a setting operation of output restriction information according to an exemplary embodiment of the present invention.

FIG. 5 is a flowchart illustrating a series of operations of setting output restriction information based on instructions by a user with respect to a predetermined region of image data stored in the HDD 204. The CPU 201 in the control unit 200 executes control of a series of operations in the flowchart shown in FIG. 5 based on a program stored in the HDD 204.

First, in step S501, the CPU 201 determines whether setting of output restriction information has been instructed (via the operation unit 220). If the CPU 201 determines that output restriction information has been instructed (YES in step S501), the processing proceeds to step S502. If the CPU 201 determines that no instruction was issued (NO in step S501), the CPU 201 executes another processing.

Figure 6:
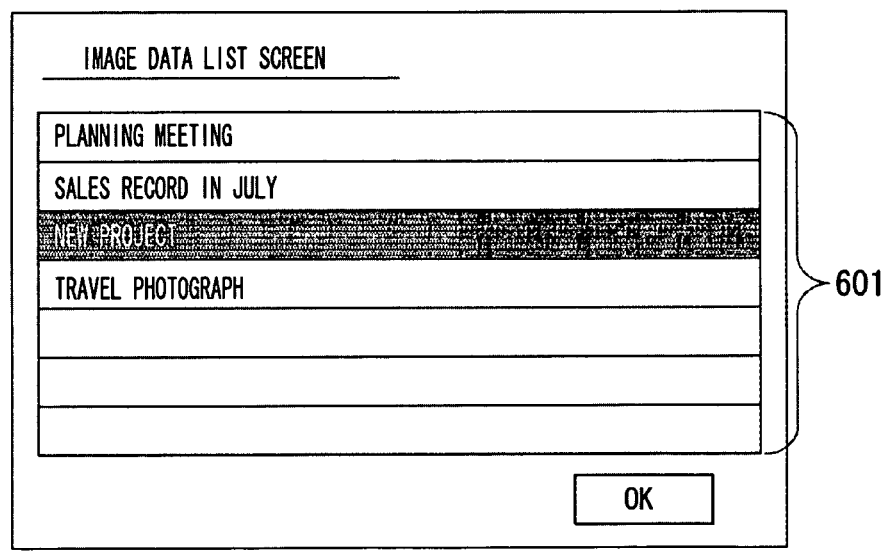
FIG. 6 illustrates an example image data list displayed on a liquid crystal panel unit according to an exemplary embodiment of the present invention.

In step S502, the CPU 201 displays an image data list stored in the HDD 204 on the liquid crystal panel unit 300. FIG. 6 illustrates an image data list screen displayed on the liquid crystal panel unit 300. On a display area 601, file names of image data stored in the HDD 204 are displayed in the form of a list.

A user can touch a section in the display area 601 where a file name of a desired image data is displayed to highlight the desired image, and then presses the OK button 602 to select the image data. In the example illustrated in FIG. 6, image data with a file name "new project" is selected and highlighted.

In step S503 in FIG. 5, the CPU 201 determines whether a user selected any image data from the image data list screen in FIG. 6. If the CPU 201 determines that image date was selected, (YES in step S503), the processing proceeds to step S504. In step S504, the CPU 201 executes preview display of the selected image data.

Figure 7:
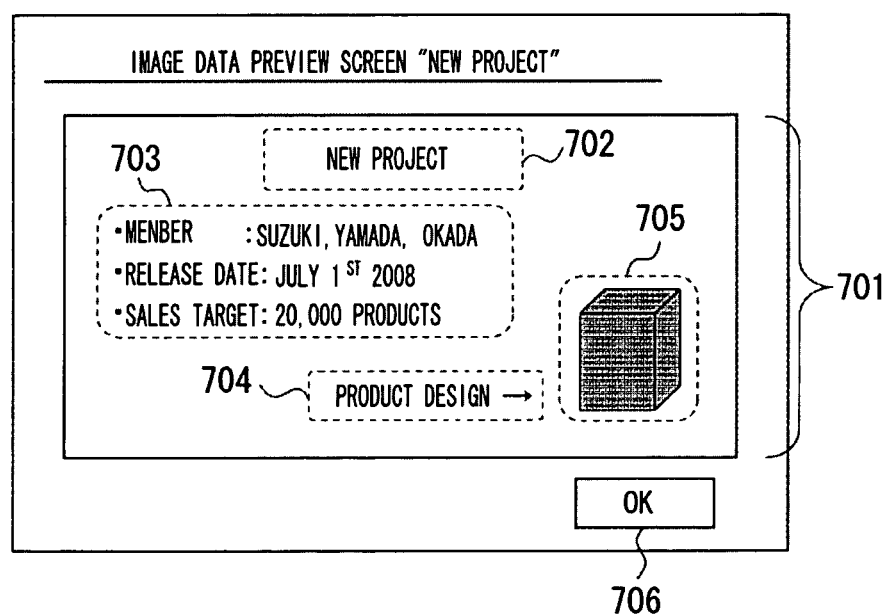
FIG. 7 illustrates an example image data preview screen displayed on a liquid crystal panel unit according to an exemplary embodiment of the present invention.

FIG. 7 illustrates an image data preview displayed on the liquid crystal panel unit 300. In a display area 701, a preview of image data of "new project" is displayed. At this time, based on a result of region division processing executed in step S404 in FIG. 4, respective divided regions 702, 703, 704, and 705 are surrounded by a broken line and displayed. Thus, the respective regions can be identified. The respective areas 702, 703 and 704 are determined as a letter region and the area 705 is determined as an image region. In order to select a particular region, a user touches the display area 701 where a desired region is displayed.

In step S505 in FIG. 5, the CPU 201 determines whether a user selected any of the regions and pressed an OK button 706 in the image data preview screen shown in FIG. 7. If the CPU 201 determines that a user pressed the OK button 706 (YES in step S505), the processing proceeds to step S506. In step S506, the CPU 201 displays a screen to set output restriction information with respect to the selected region.

Figure 8:
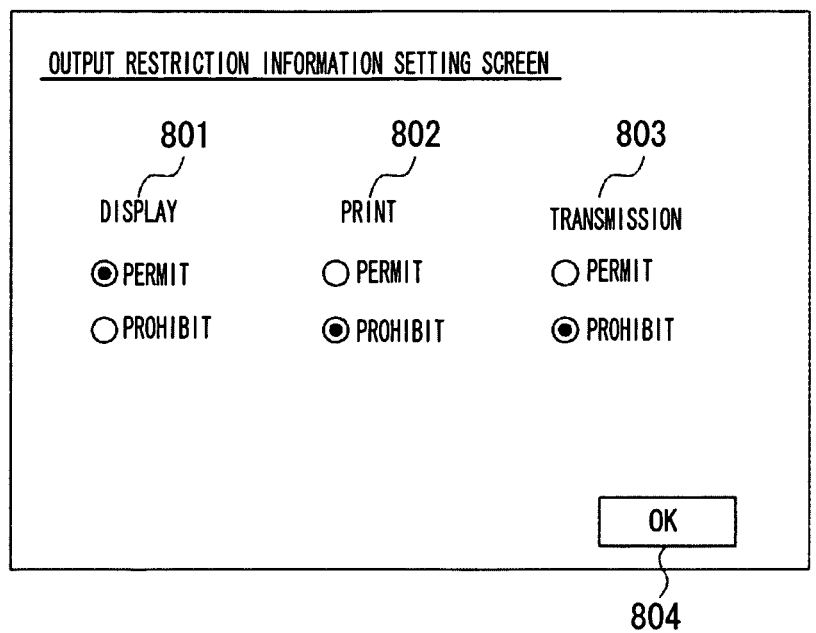
FIG. 8 illustrates an example output restriction information setting screen displayed on a liquid crystal panel unit according to an exemplary embodiment of the present invention.

FIG. 8 illustrates an output restriction information setting screen to set output restriction information corresponding to the selected region displayed on the liquid crystal panel unit 300. A display area 801 is used to designate permission or prohibition of displaying image data contained in the region selected by a user.

FIG. 8 illustrates an example that permission to display an image contained in the selected region is selected. When a user makes no selection, "permit" is selected. That is, "permit" is predetermined as a default setting.

Display areas 802 and 803, as well as the display area 801, are used to designate permission or prohibition of printing and transmitting an image contained in the selected region respectively. FIG. 8 illustrates an example that prohibition of printing and transmitting the image contained in the selected region is designated.

Here, "display" refers to an output method of outputting the data to display image data on the display apparatus 110. With respect to a display method, image data can be output to not only a locally connected apparatus, such as the display apparatus 110, but also a display apparatus connected via the LAN 150 and a projection apparatus, such as a projector.

Further, "printing" refers to an output method of causing the printer 230 to print output image data. If the MFP 100 itself does not include a printer, image data can be output to another printer.

Also, "transmission" refers to an output method of attaching image data to an electronic mail and outputting to the LAN 150 for transmission. The transmission method is not limited to electronic mail, and can include, but is not limited to, file transfer protocol (FTP) transmission, server message block (SMB) transmission, and facsimile transmission via a modem (not shown).

In step S507 in FIG. 5, the CPU 201 determines whether an OK button 804 is pressed in the output restriction information setting screen shown in FIG. 8. Here, if the CPU 201 determines that the OK button 804 has been pressed (YES in step S507), the processing proceeds to step S508. In step S508, the CPU 201 sets output restriction information based on the designation of a user.

Figure 9:
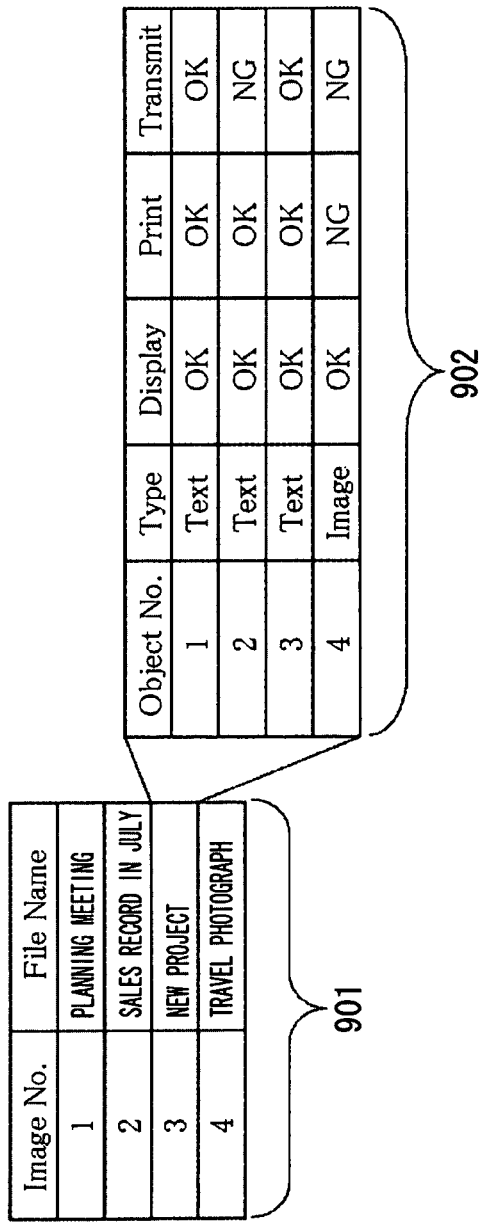
FIG. 9 illustrates an example output restriction information management table according to an exemplary embodiment of the present invention.

FIG. 9 illustrates an output restriction information management table to manage output restriction information set in response to each region in each image data stored in the HDD 204. As shown in FIG. 9, the output restriction information management table includes a main table 901 and a sub table 902. Based on the information, the CPU 201 executes output restriction in response to an output method described below.

The output restriction information management table is stored in the HDD 204. While the present embodiment describes storing the output restriction information in a table format, any format that would enable practice of the present invention is applicable. In step S509 in FIG. 5, the CPU 201 determines, based on an instruction from a user, whether or not to continue setting of the output restriction information. If it is determined to continue setting of the output restriction information (NO in step S509), the processing returns to step S501 to continue the processing.

Figure 10:
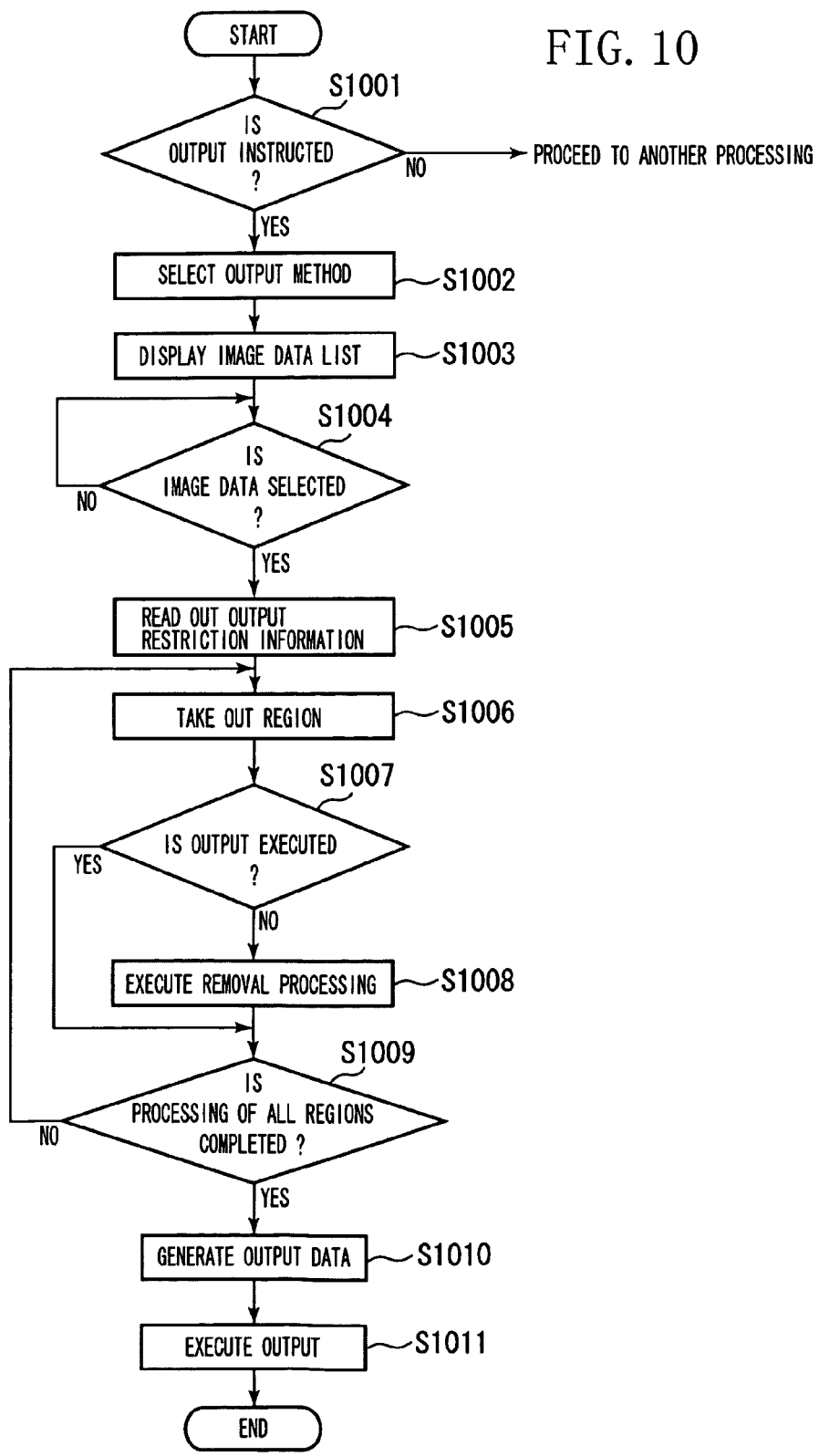
FIG. 10 is a flowchart illustrating an operation of outputting image data according to an exemplary embodiment of the present invention.

Next, the processing of outputting image data set with output restriction information will be described. FIG. 10 is a flowchart illustrating a series of operations of determining whether to output image data instructed to be output based on output restriction information per region of the image data and controlling the output based on a result of the determination. The CPU 201 of the control unit 200 controls the series of operations in a flowchart shown in FIG. 10 based on a program stored in the HDD 204.

First, in step S1001, the CPU 201 determines whether output of image data was instructed (via the operation unit 220). If the CPU 201 determines that output has been instructed (YES in step S1001), the processing proceeds to step S1002. If the CPU 201 determines no instruction was issued (NO in step S1001), the CPU 201 executes another processing.

Next, in step S1002, the CPU 2001 selects an output method of image data based on instructions from the user. In the present embodiment, any one of the output methods, i.e., display, printing, and transmission, can be selected.

In step S1003, in order to select image data to be output, the CPU 201 displays image data stored in the HDD 204 on the liquid crystal panel unit 300 in the form of a list, similar to that illustrated in FIG. 6.

In step S1004, the CPU 201 determines whether any image data has been selected. If the CPU 201 determines that image data has been selected (YES in step S1004), the processing proceeds to step S1005. In step S1005, the CPU 201 reads an output restriction information table stored in the HDD 204 to retrieve output restriction information corresponding to the selected image data.

Next, in step S1006, the CPU 201 retrieves a region from among a plurality of regions contained in the image data selected in step S1004. Then, in step S1007, the CPU 201 determines whether to output the image data contained in the region retrieved in step S1006.

If the CPU 201 determines to output the image data in the retrieved region (YES in step S1007), the processing proceeds to step S1009. If the CPU 201 determines not to output the image data (NO in step S1007), the processing proceeds to step S1008. In step S1008, the CPU 201 executes output restriction processing for the image included in the region determined not to be output by removing the image data corresponding to the region determined not to be output.

In step S1008, removal of the image data refers to deletion of data corresponding to an image in a region to be deleted. Further, without deleting data itself, processing to overwrite the image data contained in the deleted rejoin with another new image can also be employed so as not to show an original image.

In step S1009, the CPU 201 determines whether the processing of all regions contained in the selected image data is completed. If an unprocessed region still exists (NO in step S1009), the processing returns to step S1006, where the CPU 201 retrieves the unprocessed region.

If the CPU 201 determines that the processing of all the regions was completed (YES in step S1009), the processing proceeds to step S1010. In step S1010, the CPU 201 generates output data corresponding to respective output methods based on the selected image data. Specifically, when image data is displayed, the CPU 201 converts the image data into a display signal. Further, when image data is printed, the CPU 201 rasterizes the image data into bit map image data in order to output the data from the printer 230. Furthermore, when image data is transmitted, the CPU 201 converts the image data into electronic mail format. Then, in step S1011, the CPU 201 outputs output data generated using the selected output method.

As described above, in the present embodiment, the CPU 201 divides regions when reading an image on a document to input image data and sets output restriction information in response to each divided region. The output restriction information contains information indicating permission or prohibition to output image data using each of a plurality of output methods. Then, when it is instructed to output the image data, the CPU 201 determines whether to output the image data per region contained in the image data. Based on a result of the determination, the CPU 201 controls each output unit. This allows output restriction in response to output methods to be easily executed for each region of the image data. Thus, security can be more highly improved.

In the above description, each region based on the result of region division processing was displayed on the image data preview screen shown in FIG. 7 as an option. However, another method can be employed. That is, if a user does not select the prepared region but optionally designates a region and can set output restriction information corresponding to the region, the usability increases.

Next, a second exemplary embodiment of the present invention will be described. The first exemplary embodiment set output restriction information for a predetermined region of image data input by the scanner 240, while the second exemplary embodiment sets output restriction information for a predetermined region of input image data which is received from the PC 130.

Further, the first exemplary embodiment set output restriction information for a region divided by region division processing, while the second exemplary embodiment sets output restriction information for an object contained in vectorized image data.

A basic configuration in the present embodiment is similar to that in the first embodiment. Thus, description will not be repeated. In the following description, the differences between the present embodiment and the first embodiment will be described.

Figure 11:
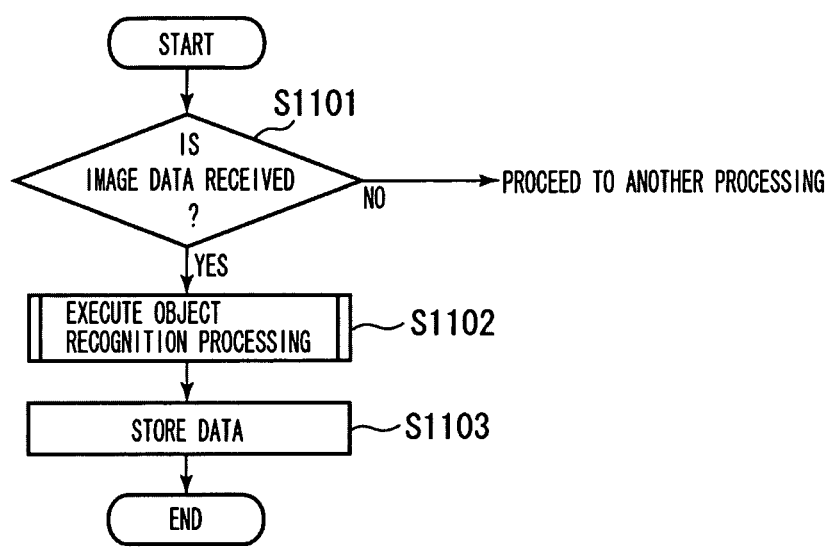
FIG. 11 is a flowchart illustrating an operation of receiving image data from a personal computer (PC) to input the image data according to an exemplary embodiment of the present invention.

A series of operations of receiving image data from the PC 130 via the network I/F 205 to store the data in the HDD 204 will be described with reference to a flowchart shown in FIG. 11. The CPU 201 executes control of the series of operations in the flowchart shown in FIG. 11 based on a program stored in the HDD 204.

First, in step S1101, the CPU 201 determines whether image data was received from the PC 130. If the CPU 201 determines that the image data has been received from the PC 130 (YES in step S1101), the processing proceeds to step S1102. If the CPU 201 determines that the image data has not been received from the PC 130 (NO in step S1101), the CPU 201 executes another processing.

In step S1102, the CPU 201 executes object recognition processing for the received image data. The object recognition processing refers to processing of analyzing the contents of the image data and discriminating each object contained in the image data to recognize it.

As an algorithm used in the object recognition processing, for example a vectorization technique discussed in Japanese Patent Application Laid-Open No. 2005-107691 can be employed. When vectorization is performed in this way, the received image data may once be rasterized into a bit map image by the RIP unit 211 as required.

Further, as another example of the object recognition processing, markup language such as page description language (PDL), hypertext markup language (HTML), and extensible markup language (XML) received from external apparatuses such as the PC 130 can directly be analyzed to recognize objects contained in image data.

In step S1103, the CPU 201 stores the received image data in the HDD 204 together with information indicating each object obtained by the object recognition processing in step S1102. An example in which the object recognition processing is automatically executed for received image data has been described herein. However, the present invention is not limited to the above described method, and any method that would enable practice of the present invention is applicable.

For example, the object recognition processing can be executed not just for all received image data, but for image data selected by a user at any time.

Next, a setting of output restriction information in the present embodiment will be described. The setting of output restriction information in the present embodiment is executed according to the flowchart in FIG. 5. While the first embodiment selects a region divided by region division processing as a region for setting output restriction information, the second exemplary embodiment selects an object recognized by the object recognition processing.

Figure 12:
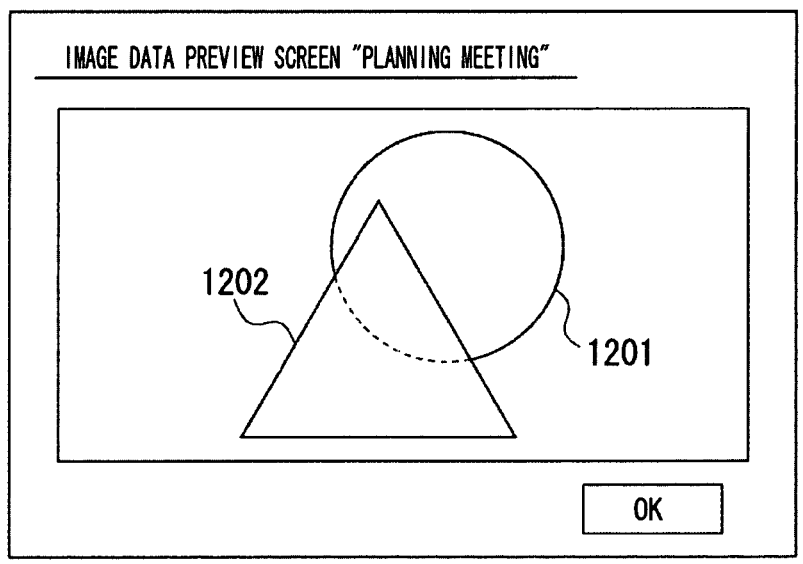
FIG. 12 illustrates an example image data preview screen displayed on a liquid crystal panel unit according to an exemplary embodiment of the present invention.

FIG. 12 illustrates an example of an image data preview screen to be displayed in step S504 in FIG. 5 according to the present embodiment. A screen shown in FIG. 12 corresponds to the screen shown in FIG. 7. The example shown in FIG. 12 displays a circle and a triangle as a preview of image data on "planning meeting". Then, by the above-described object recognition processing, the circle and the triangle are recognized as independent objects 1201 and 1202 respectively.

A user can touch a display area where an intended object is displayed on the screen shown in FIG. 12 and select any of the region to set the output restriction information.

Thus, the present embodiment provides for not only designating a displayed region, but also sets the output restriction information for the object. Accordingly, the present embodiment can also separately restrict outputs of superimposed objects respectively.

Next, the processing of outputting image data set with output restriction information in the present embodiment will be described. The setting of output restriction information in the present embodiment is executed according to the flowchart in FIG. 10. While the first embodiment removes a region divided by region division processing in step S1008, the second exemplary embodiment removes an object recognized by object recognition processing in step S1008.

Figure 13:
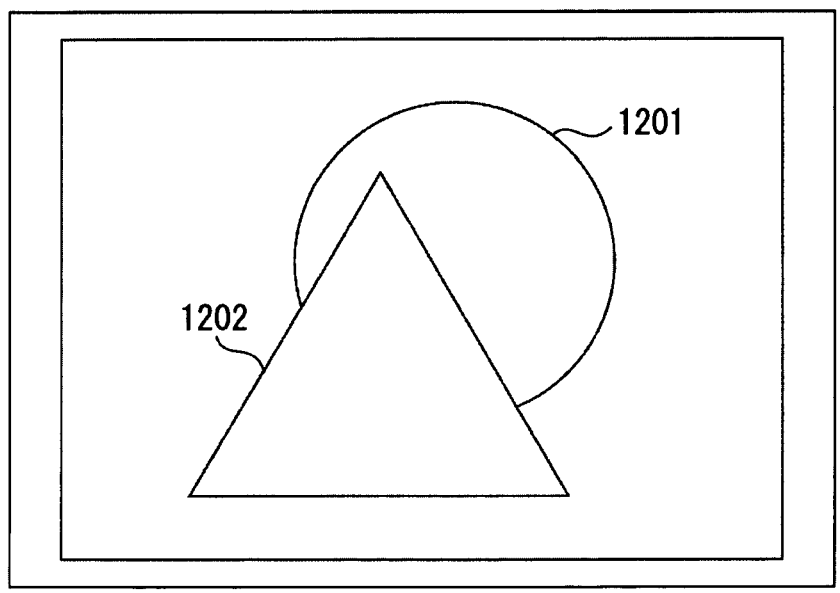
FIG. 13 illustrates an example screen displayed on a display apparatus according to an exemplary embodiment of the present invention.
Figure 14:
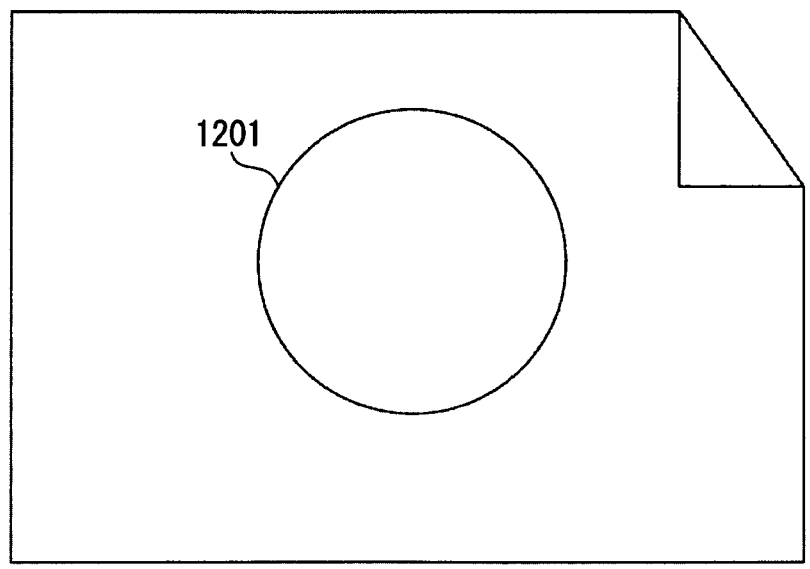
FIG. 14 illustrates an example printed matter printed by a printer according to an exemplary embodiment of the present invention.

FIGS. 13 and 14 illustrate an example of a screen displaying image data of "planning meeting" by the display apparatus 110 and an example of a printed matter printed by the printer 230 respectively. The object 1201 is set with the output restriction information that indicates permission of both display and printing, and the object 1202 is set with the output restriction information that indicates permission of display and prohibition of printing.

As shown in FIG. 13, since the objects 1201 and 1202 are both permitted to be displayed, both a circle and a triangle are displayed on the display 110. On the other hand, as shown in FIG. 14, since the object 1201 is permitted to be printed and the object 1202 is prohibited from being printed, the object 1202 is removed and only the object 1201 is printed.

As described above, in the present embodiment, the CPU 201 executes object recognition processing for image data received from the PC 130 and sets output restriction information for an object recognized by the object recognition processing. Then, when an output of image data is instructed, the CPU 201 determines whether to output for each object contained in the image data. Based on a result of the determination, the CPU 201 controls each output unit. This allows output restriction in response to output methods to be easily executed for each object of the image data. Thus, security can more highly be improved.

Thus, the above-described exemplary embodiments can set output restriction information for a predetermined region of image data and restrict output in response to output methods. For example, if display is permitted and printing is prohibited in order to prevent unintended dissemination of information, an output can be easily restricted without generating another image data in advance for each output method. Further, the above-described embodiments can also handle a case where, for example, printing data as materials for distribution is permitted and transmission is prohibited since if electronic data is distributed as is, the data could be arbitrarily edited by other people.

In the above-described exemplary embodiments, as a predetermined region for setting output restriction information, examples using a region divided by region division processing and an object recognized by object recognition processing were described. However, the embodiments are not limited to those methods, and any methods that would enable practice of either embodiment are applicable.

That is, a designation method is not limited to the above-described divided region and object. If a part of image data can be designated to set output restriction information, another designation method may also be employed.

Further, a case where the MFP 100 can output image data by a plurality of output methods such as display, printing, and transmission is described above. However, the present invention can also be applied to a case where the output method includes not only display, printing and transmission, but also other output methods.

Respective functions described in the first and second exemplary embodiments can be included individually and in combination with a plurality of functions.

The present invention can provide an embodiment such as, a system, an apparatus, a method, a program, or a storage medium (recording medium). Specifically, the present invention can be applied to not only a system including a plurality of instruments but also an apparatus including one instrument.

The present invention directly or remotely supplies software programs that realize the functions of the above-described exemplary embodiments to a system or an apparatus. The present invention is also achieved by a computer of the system or the apparatus that reads and executes the supplied program code.

Accordingly, in order to realize functional processing of the present invention, a program code installed on the computer also realizes the present invention. In other words, the present invention also includes a computer program itself in order to realize the functional processing of the present invention.

In this case, so long as the system or the apparatus has the functions of the program, it can be in the form of such as an object code, a program executed by an interpreter, or script data to be supplied to an operating system (OS).

A computer-readable recording medium for supplying a program includes, for example, a floppy disk, a hard disk, an optical disk, a magneto-optic disk, a magneto-optical disk (MO), a compact disk read-only memory (CD-ROM), a compact disc-recordable (CD-R), a compact disc-rewritable (CD-RW), a magnetic tape, a nonvolatile memory card, a read only memory (ROM), and a digital video disc (DVD) (digital video disc-read only memory (DVD-ROM), digital video disc-recordable (DVD-R)).

In another program supply method, the program can also be supplied by downloading from a homepage of the Internet to a recording medium such as a hard disk using a browser of a client computer. That is, the program code itself of the present invention, or a file which is compressed and contains an automatic installation function is downloaded from a homepage by connecting the homepage. Further, the present invention can also be realized by dividing a program code including the program of the present invention into a plurality of files and downloading respective files from different homepages. That is, the present invention also includes a world wide web (WWW) server from which a plurality of users can download the program file for realizing functional processing of the present invention by a computer.

Further, the program of the present invention can be encrypted, stored in a recording medium such as a CD-ROM, and distributed to users. Then, the user who satisfies predetermined conditions can download key information for decryption from the homepage via the Internet. Then, the user can execute the encrypted program using the key information to install the program on a computer. Thus, the present invention can also be realized.

Furthermore, the functions of the above-described exemplary embodiments can be realized by executing the program read by a computer. In addition, an OS or the like which runs on a computer based on commands of the program executes a part or the whole of actual processing. The functions of the above-described embodiments can be realized by the processing.

Still furthermore, after a program read from a recording medium is written into a memory provided on a function expansion board inserted into a computer and a function expansion unit connected to a computer, the functions of the above-described embodiments can be realized. That is, based on the command of the program, a CPU or the like provided on the function expansion board and the function expansion unit executes a part or the whole of the actual processing and realizes the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-097487 filed Apr. 3, 2007, which is hereby incorporated by reference herein in its entirety.

What is claimed is:

1. An image processing apparatus configured to output image data using one of a plurality of output methods, the image processing apparatus comprising:
a receiving unit configure to receive the image data from an original image, wherein the received image is not associated with output restriction information;
a storage unit configured to store the image data divided into a plurality of regions;
a management unit configured to manage output restriction information received from a user that specifies, for each region selected by the user, to one of permit output and prohibit output of that selected region as a function of each output method of the plurality of output methods;
a selecting unit configured to select an output method from the plurality of output methods, wherein the plurality of output methods includes a first output method and a second output method, and wherein the plurality of output methods at least includes displaying and printing;
a determining unit configured to determine, for each region and based on the managed output restriction information and a selected output method, whether to permit output or prohibit output of a region from the plurality of regions of the image data; and
an output unit configured to output the image data by using the selected output method,
wherein, in response to the selecting unit selecting the first output method, the determining unit determines to prohibit output of a first region, removes the first region from the image data, and restricts the first region from being output with the plurality of regions of the image data by the output unit using the first output method, and
wherein, in response to the selecting unit selecting the second output method, the determining unit determines to permit output of the first region, and permits the first region to be output with the plurality of regions of the image data by the output unit using the second output method.

2. The image processing apparatus according to claim 1, wherein the plurality of output methods further includes transmission in addition to displaying and printing.

3. The image processing apparatus according to claim 1, wherein the output unit outputs the image data to a display apparatus connected to the image processing apparatus in response to the selecting unit selecting displaying as the output method of the image data.

4. The image processing apparatus according to claim 1, wherein the output unit outputs the image data to a printing apparatus connected to the image processing apparatus in response to the selecting unit selecting printing as the output method of the image data.

5. The image processing apparatus according to claim 1, further comprising:
a division unit configured to divide the image data from the original image into the plurality of regions before the management unit receives the output restriction information from the user.

6. The image processing apparatus according to claim 1, further comprising:
a recognition unit configured to recognize an object contained in the image data, wherein the management unit manages output restriction information received from the user that specifies to one of permit output and prohibit output of that object as a function of each output method of the plurality of output methods.

7. The image processing apparatus according to claim 1, further comprising:
a display unit configured to display a preview of the image data from an original image as divided into the plurality of regions, wherein the output restriction information received from the user is based on input from the user into the display unit as associated with a selected region.

8. A method for an image processing apparatus configured to output image data using one of a plurality of output methods, the method comprising:
receiving the image data from an original image, wherein the received image is not associated with output restriction information;
storing the image data divided into a plurality of regions;
managing output restriction information received from a user that specifies, for each region selected by the user, to one of permit output and prohibit output of that selected region as a function of each output method of the plurality of output methods;
selecting an output method from the plurality of output methods, wherein the plurality of output methods includes a first output method and a second output method, and wherein the plurality of output methods at least includes displaying and printing;
determining, for each region and based on the managed output restriction information and a selected output method, whether to permit output or prohibit output of a region from the plurality of regions of the image data; and
outputting the image data by using the selected output method, wherein, in response to selecting the first output method, determining includes determining to prohibit output of a first region, removing the first region from the image data, and restricting the first region from being output with the plurality of regions of the image data using the first output method, and wherein, in response to selecting the second output method, determining includes determining to permit output of the first region, and permitting the first region to be output with the plurality of regions of the image data using the second output method.

9. A non-transitory computer-readable storage medium storing a computer program, the computer program causing a computer to execute the method of claim 8.

10. The image processing apparatus according to claim 1, wherein, in response to the selecting unit selecting the first output method, the determining unit determines to permit output of a second region, and permits the second region to be output with the plurality of regions of the image data by the output unit using the first output method; and wherein, in response to the selecting unit selecting the second output method, the determining unit determines to prohibit output of a second region, removes the second region from the image data, and restricts the second region from being output with the plurality of regions of the image data by the output unit using the second output method.

11. The image processing apparatus according to claim 1, wherein the entire image data is divided into a plurality of regions, and wherein, in response to the selecting unit selecting the second output method, a second region is overwritten with another new image, wherein the second region and the another new image additionally are output with the plurality of regions of the image data by the output unit using the second output method to not show the original image.

* * * * *